(12) United States Patent
Ahmadi et al.

(10) Patent No.: US 10,917,527 B2
(45) Date of Patent: Feb. 9, 2021

(54) POLICY DEVICE SELECTION BY COMMON IMS

(71) Applicant: Verizon Patent and Licensing Inc., Arlington, VA (US)

(72) Inventors: Hossein M. Ahmadi, Parsippany, NJ (US); Sudhakar Reddy Patil, Flower Mound, TX (US); Violeta Cakulev, Millburn, NJ (US); Robert Avanes, Roanoke, TX (US); Lalit R. Kotecha, San Ramon, CA (US)

(73) Assignee: Verison Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/404,215

(22) Filed: May 6, 2019

(65) Prior Publication Data

US 2020/0358909 A1    Nov. 12, 2020

(51) Int. Cl.
| | | |
|---|---|---|
| *H04M 15/00* | (2006.01) | |
| *H04L 29/06* | (2006.01) | |
| *H04W 8/08* | (2009.01) | |
| *H04W 76/11* | (2018.01) | |
| *H04W 80/10* | (2009.01) | |

(52) U.S. Cl.
CPC ........ *H04M 15/66* (2013.01); *H04L 65/1016* (2013.01); *H04W 8/08* (2013.01); *H04W 76/11* (2018.02); *H04W 80/10* (2013.01)

(58) Field of Classification Search
CPC ....... H04M 15/66; H04W 8/08; H04W 80/10; H04W 76/11; H04L 65/1016
See application file for complete search history.

(56) References Cited

U.S. PATENT DOCUMENTS

| | | | | |
|---|---|---|---|---|
| 2019/0166086 | A1* | 5/2019 | Mirza | H04L 61/1529 |
| 2019/0166523 | A1* | 5/2019 | Shaw | H04W 76/16 |
| 2019/0306324 | A1* | 10/2019 | Al-Mehdar | H04L 65/104 |
| 2020/0053133 | A1* | 2/2020 | Atarius | H04L 65/1073 |
| 2020/0260370 | A1* | 8/2020 | Nithiyanantham | H04W 36/12 |
| 2020/0328904 | A1* | 10/2020 | Mirza | H04L 65/1016 |

OTHER PUBLICATIONS

U.S. Appl. No. 62/717,673, filed Aug. 2018, Atarius et al.*

* cited by examiner

*Primary Examiner* — Joseph E Dean, Jr.

(57) ABSTRACT

A computer device may include a memory storing instructions and processor configured to execute the instructions to receive a request associated with a subscriber, wherein the request includes information identifying whether the user is a Fifth Generation (5G) subscriber or information identifying a gateway device associated with the user. The computer device may be further configured to select a Fourth Generation (4G) Policy and Charging Rules Function (PCRF) device or a 5G Policy Control Function (PCF) device based on the information included in the received request and forward the received request to the selected 4G PCRF device or 5G PCF device.

20 Claims, 10 Drawing Sheets

US 10,917,527 B2

1
POLICY DEVICE SELECTION BY COMMON IMS

BACKGROUND INFORMATION

In order to satisfy the needs and demands of users of mobile communication devices, providers of wireless communication services continue to improve and expand available services as well as networks used to deliver such services. One aspect of such improvements includes the development of core networks as well as options to utilize such core networks. A core network may manage a large number of devices experiencing different conditions. Managing all the different devices associated with different conditions poses various challenges.

DETAILED DESCRIPTION OF PREFERRED EMBODIMENTS

Figure 1:
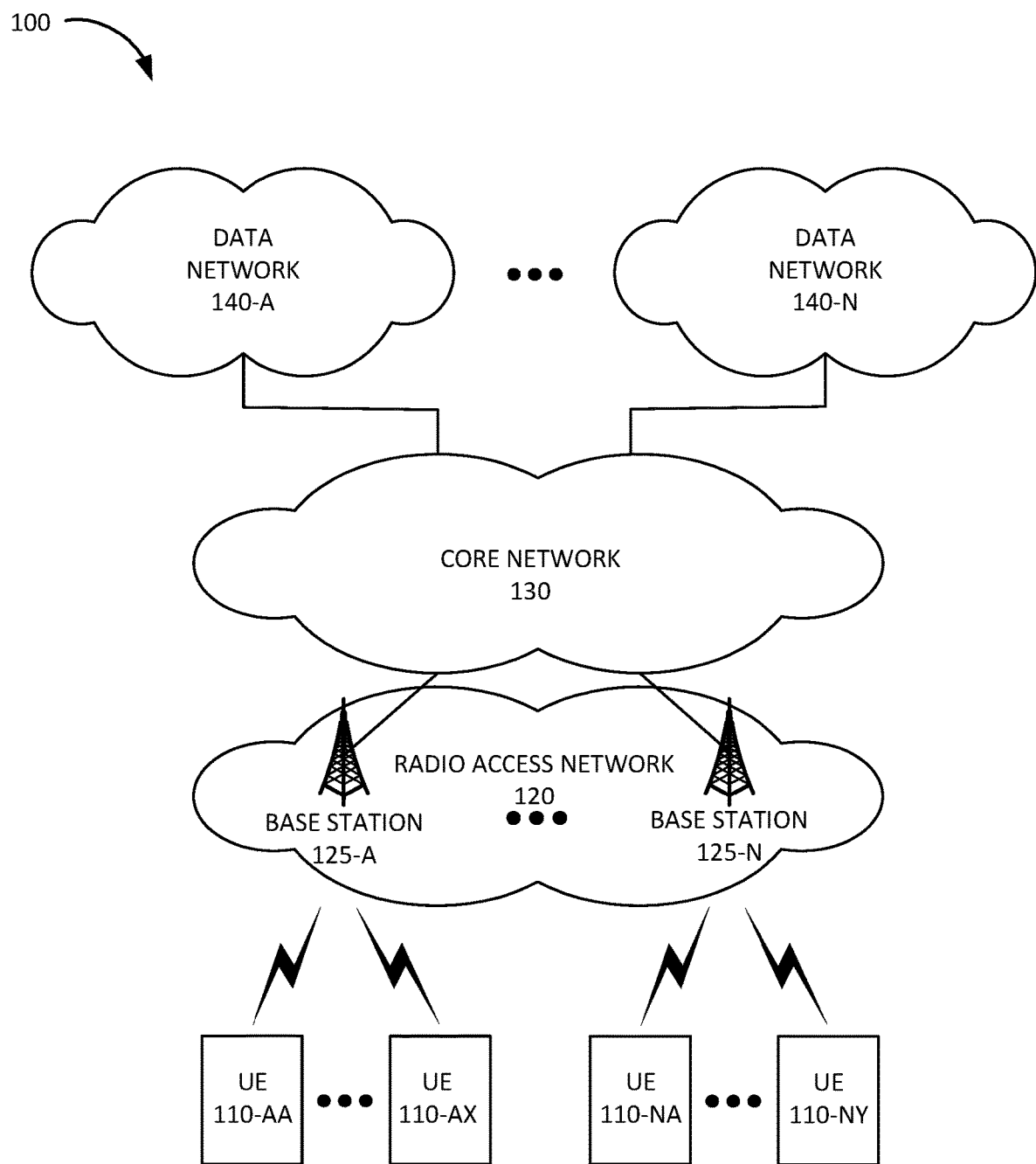
FIG. 1 is a diagram illustrating an environment according to an implementation described herein.

The following detailed description refers to the accompanying drawings. The same reference numbers in different drawings identify the same or similar elements.

As communication networks and services increase in size, complexity, and number of users, management of the communication networks have become increasingly more complex. One way in which wireless access networks are continuing to become more complicated is by incorporating various aspects of next generation networks, such as 5$^{th}$ generation (5G) mobile networks, utilizing high frequency bands (e.g., 24 Gigahertz (GHz), 39 GHz, etc.), and/or lower frequency bands such as Sub 6 GHz, and a large number of antennas. 5G New Radio (NR) millimeter (mm) wave technology may provide significant improvements in bandwidth and/or latency over other wireless network technology. Furthermore, coverage and signal quality may be improved using multiple-input and multiple-output (MIMO) adaptive antenna arrays. Additionally, user equipment (UE) devices may also include multiple antennas to improve spectral efficiency.

Moreover, improvements in the core networks of 5G wireless access networks provide new functionality, such as, for example, network slicing. Network slicing is a form of virtual network architecture that enables multiple logical networks to be implemented on top of a common shared physical infrastructure using software defined networking (SDN) and/or network function virtualization (NFV). Each logical network, referred to as a "network slice," may encompass an end-to-end virtual network with dedicated storage and/or computation resources, may be configured to implement a different set of requirements and/or priorities, and/or may be associated with a particular Quality of Service (QoS) class, type of service, and/or particular enterprise customer associated with a set of UE devices. Thus, a 5G core network may include different components, also referred to as network functions, than those of a 4G core network.

An Internet Protocol (IP) Multimedia Subsystem (IMS) network may be used to deliver IP multimedia services, including telephone calls, to UE devices. Thus, a UE device may connect to an IMS network via a 4G or 5G core network using a radio access network (RAN) in order to initiate or receive a telephone call and the IMS network may connect the UE device to the other party.

In a 4G Long Term Evolution (LTE) core network, during the initiation of an IMS connection, a Packet Data Network Gateway (PGW) may send a Credit Control (CC) Request command to a Policy and Charging Rules Function (PCRF) for Internet Protocol (IP) Connectivity Access Network (CAN) session establishment over a Diameter Gx interface. The PCRF may respond by sending a CC Answer command to the PGW to install Policy and Charging Control (PCC) rules and event triggers. During a Voice over LTE (VoLTE) call setup, a Proxy Call Session Control Function (P-CSCF) may send an Authentication Authorization Request (AAR) request over a Diameter Rx interface to the PCRF. The PCRF may then perform session binding, to associate the session over the Rx interface with the session over the Gx interface, and may install the appropriate policies over the Gx session by returning an AA Answer (AAA) to the P-CSCF.

In a 5G core network, a Policy Control Function (PCF) may act as the policy device, a User Plane Function (UPF) device may act as a gateway device, and a CSCF device may be configured to function as an IMS Application Function (AF) that communicates with the PCF device over a Diameter NG5 interface. During a VoLTE call set up, the IMS AF, configured as the P-CSCF, may send an AAR message over an Rx interface to the PCF. The PCF may respond with an AAR message to the P-CSCF and may perform session binding between the Rx session and a Protocol Data Unit (PDU) session associated with the VoLTE call and install policies over an NG7 session to a Session Management Function (SMF) managing the UPF device that is associated with the VoLTE call.

In a large distributed 4G communication network, there may be multiple PGW devices, multiple P-CSCF devices, and multiple PCRF devices. Messages from a P-CSCF over an Rx interface should arrive at the same PCRF device that has received the Gx from the PGW associated with the IMS call. Therefore, PGW, P-CSCF, and/or PCRF devices may communicate via Diameter Routing Agent (DRA) devices that route traffic to the appropriate device. For example, a DRA device may include a mapping table that relates PGWs and P-CSCFs to PCRFs and may select a particular PCRF as a destination for a Diameter message based on which particular P-CSCF or PGW originated the Diameter message.

Furthermore, a 5G network may have multiple SMF devices, multiple IMS AF devices configured as CSCFs, and/or multiple PCF devices. A common IMS may be used in an area that includes both a 4G core network and a 5G core network and both the 4G PCRF devices and the 5G PCF devices may be served by the same DRA devices. A DRA device may not be able to distinguish whether an Rx message is associated with a 5G subscriber and thus may not be able to determine whether to select a PCRF device or a PCF device as the policy device for a particular IMS call.

Implementations described herein relate to policy device selection by a common IMS. A DRA device may be configured to receive a request, associated with a subscriber, that includes information identifying whether the user is a 5G subscriber or information identifying a gateway device associated with the user; select a 4G PCRF device or a 5G PCF device based on the information included in the received request; and forward the received request to the selected 4G PCRF device or the 5G PCF device. The request may include a Diameter AAR received from a CSCF device.

A 5G subscriber may be associated with a 5G subscriber profile in a Home Subscriber Server (HSS), while a 4G subscriber may be associated with a 4G subscriber profile in the HSS. The policies for an IMS call may be based on the subscription type. Thus, a 5G subscriber may be associated with 5G policies and may require the selection of a 5G PCF device, while a 4G subscriber may be associated with 4G policies and may require the selection of a 4G PCRF device. For example, a 5G subscriber may be in an area where 5G service is not available and may connect to a 5G core network using a 4G RAN (e.g., via an eNodeB). However, the 4G RAN may connect the 5G subscriber to a 5G core network and may thus need to select a 5G PCF device for an IMS call associated with the 5G subscriber. The CSCF device may obtain the subscriber type information for the IMS call from the HSS and include the subscriber type information in the Diameter AAR sent to the DRA.

In some implementations, the request may include an attribute value pair (AVP) that identifies whether the user is a 5G subscriber. If the AVP identifies the user as a 5G subscriber, the DRA may select a 5G PCF device, in response to receiving the request. If the AVP identifies the user as not being a 5G subscriber, the DRA may select a 4G PCRF device, in response to receiving the request.

In some implementations, the request may include a gateway device identifier associated with a data connection associated with the user and the DRA may build a mapping table that relates particular gateway device identifiers to particular 4G PCRF devices or 5G PCF devices. The DRA may then select the 4G PCRF device or the 5G PCF device for a particular request based on the gateway device identifier, associated with the request, using the mapping table. Thus, if the gateway device identifier corresponds to a PGW identifier, the DRA may select a 4G PCRF device from the mapping table, in response to the gateway device identifier corresponding to the PGW identifier. On the other hand, if the gateway device identifier corresponds to an SMF identifier, the DRA may select a 5G PCF device from the mapping table, in response to the gateway device identifier corresponding to the SMF identifier.

The terms "PCRF device," PCF device," "CSCF device," and/or other network devices described herein, may refer to a dedicated hardware component implementing a network function instance or to a hardware component that is part of a common shared physical infrastructure used to implement virtualized network function instances using SDN or another type of virtualization technique. Thus, the network device may be configured to implement a particular network function instance as a Virtual Network Function (VNF) (e.g., in a virtual machine), as a Cloud-native Network Function (CNF) (e.g., in a container), as a serverless architecture event handler, and/or using a different type of virtualization. The common shared physical infrastructure may be implemented using one or more computer devices in a cloud computing center, a mobile edge computing (MEC) system associated with a base station, and/or in another type of computer system.

FIG. 1 is a diagram of an exemplary environment 100 in which the systems and/or methods, described herein, may be implemented. As shown in FIG. 1, environment 100 may include UE devices 110-AA to 110-NY (referred to herein collectively as "UE devices 110" and individually as "UE device 110"), a radio access network 120, a core network 130, and data networks 140-A to 140-N.

UE device 110 may include any device with long-range (e.g., cellular or mobile wireless network) wireless communication functionality. For example, UE device 110 may include a handheld wireless communication device (e.g., a mobile phone, a smart phone, a tablet device, etc.); a wearable computer device (e.g., a head-mounted display computer device, a head-mounted camera device, a wristwatch computer device, etc.); a laptop computer, a tablet computer, or another type of portable computer; a desktop computer; a customer premises equipment (CPE) device, such as a set-top box or a digital media player (e.g., Apple TV, Google Chromecast, Amazon Fire TV, etc.), a WiFi access point, a smart television, etc.; a portable gaming system; a global positioning system (GPS) device; a home appliance device; a home monitoring device; and/or any other type of computer device with wireless communication capabilities and a user interface. UE device 110 may include capabilities for voice communication, mobile broadband services (e.g., video streaming, real-time gaming, premium Internet access etc.), best effort data traffic, and/or other types of applications.

In some implementations, UE device 110 may communicate using machine-to-machine (M2M) communication, such as machine-type communication (MTC), and/or another type of M2M communication. For example, UE device 110 may include a health monitoring device (e.g., a blood pressure monitoring device, a blood glucose monitoring device, etc.), an asset tracking device (e.g., a system monitoring the geographic location of a fleet of vehicles, etc.), a traffic management device (e.g., a traffic light, traffic camera, road sensor, road illumination light, etc.), a climate controlling device (e.g., a thermostat, a ventilation system, etc.), a device controlling an electronic sign (e.g., an electronic billboard, etc.), a device controlling a manufacturing system (e.g., a robot arm, an assembly line, etc.), a device controlling a security system (e.g., a camera, a motion sensor, a window sensor, etc.), a device controlling a power system (e.g., a smart grid monitoring device, a utility meter, a fault diagnostics device, etc.), a device controlling a financial transaction system (e.g., a point-of-sale terminal, a vending machine, a parking meter, etc.), an autonomous or semi-autonomous vehicle, an unmanned aerial drone, and/or another type of electronic device.

Radio access network 120 may enable UE devices 110 to connect to core network 130 for mobile telephone service, Short Message Service (SMS) message service, Multimedia Message Service (MMS) message service, Internet access, cloud computing, and/or other types of data services. Radio access network 120 may include base stations 125-A to 125-N (referred to herein collectively as "base stations 125" and individually as "base station 125"). Each base station 125 may service a set of UE devices 110. For example, base station 125-A may service UE devices 110-AA to 110-AX, etc., to base station 125-N, which may service UE devices 110-NA to 110-NY. In other words, UE devices 110-AA to 110-AX may be located within the geographic area serviced by base station 125-A, and other UE devices 110 may be serviced by another base station 125.

Base station 125 may include a 4G LTE base station (e.g., an eNodeB) or a 5G NR base station (e.g., a gNodeB). Base station 125 may include one or more radio frequency (RF) transceivers (also referred to as "cells" and/or "base station sectors") facing particular directions. For example, base station 125 may include three RF transceivers and each RF transceiver may service a 120° sector of a 360° field of view. If base station 125 includes a 5G NR base station, each RF transceiver may include an antenna array. The antenna array may include an array of controllable antenna elements configured to send and receive 5G NR wireless signals via one or more antenna beams. The antenna elements may be digitally controllable to electronically tilt, or adjust the orientation of, an antenna beam in a vertical direction and/or horizontal direction. In some implementations, the antenna elements may additionally be controllable via mechanical steering using one or more motors associated with each antenna element. The antenna array may serve k UE devices 110, and may simultaneously generate up to k antenna beams. A particular antenna beam may service multiple UE devices 110. In some implementations, base station 125 may also include a 4G base station (e.g., an eNodeB). Furthermore, in some implementations, base station 125 may include a mobile edge computing (MEC) system that perform cloud computing and/or network processing services for UE devices 110.

Core network 130 may manage communication sessions for UE devices 110. For example, core network 130 may establish an IP connection between UE device 110 and a particular data network 140. Furthermore, core network 130 may enable UE device 110 to communicate with an application server, and/or another type of device, located in a particular data network 140 using a communication method that may not require the establishment of an IP connection between UE device 110 and data network 140, such as, for example, Data over Non-Access Stratum (DoNAS).

In some implementations, core network 130 may include a 4G LTE core network (e.g., an evolved packet core (EPC) network). In other implementations, core network 130 may include a Code Division Multiple Access (CDMA) network. For example, the CDMA network may include a CDMA enhanced High Rate Packet Data (eHRPD) network (which may provide access to an LTE network).

Furthermore, in some implementations, core network 130 may include an LTE Advanced (LTE-A) network and/or a 5G core network or other advanced network that includes functionality such as management of 5G NR base stations in radio access network 120, which may implement carrier aggregation; advanced or massive multiple-input and multiple-output (MIMO) configurations (e.g., an 8×8 antenna configuration, a 16×16 antenna configuration, a 256×256 antenna configuration, etc.); cooperative MIMO (CO-MIMO); relay stations; Heterogeneous Networks (HetNets) of overlapping small cells and macrocells; Self-Organizing Network (SON) functionality; MTC functionality, such as 1.4 MHz wide enhanced MTC (eMTC) channels (also referred to as category Cat-M1), Low Power Wide Area (LPWA) technology such as Narrow Band IoT (NB-IoT) technology, and/or other types of MTC technology; and/or other types of LTE-A and/or 5G functionality.

Data networks 140-A to 140-N (referred to herein collectively as "data networks 140" and individually as "data network 140") may each include a packet data network. A particular data network 140 may include, and/or be connected to and enable communication with, a local area network (LAN), a wide area network (WAN), a metropolitan area network (MAN), an optical network, a cable television network, a satellite network, a wireless network (e.g., a CDMA network, a general packet radio service (GPRS) network, and/or an LTE network), an ad hoc network, a telephone network (e.g., the Public Switched Telephone Network (PSTN) or a cellular network), an intranet, or a combination of networks. Some or all of a particular data network 140 may be managed by a communication services provider that also manages core network 130, radio access network 120, and/or particular UE devices 110.

In some implementations, a particular data network 140 may include an IMS network (not shown in FIG. 1). An IMS network may include a network for delivering IP multimedia services and may provide media flows between two different UE devices 110, and/or between a particular UE device 110 and external IP networks or external circuit-switched networks (not shown in FIG. 1).

Although FIG. 1 shows exemplary components of environment 100, in other implementations, environment 100 may include fewer components, different components, differently arranged components, or additional components than depicted in FIG. 1. Additionally or alternatively, one or more components of environment 100 may perform functions described as being performed by one or more other components of environment 100.

Figure 2:
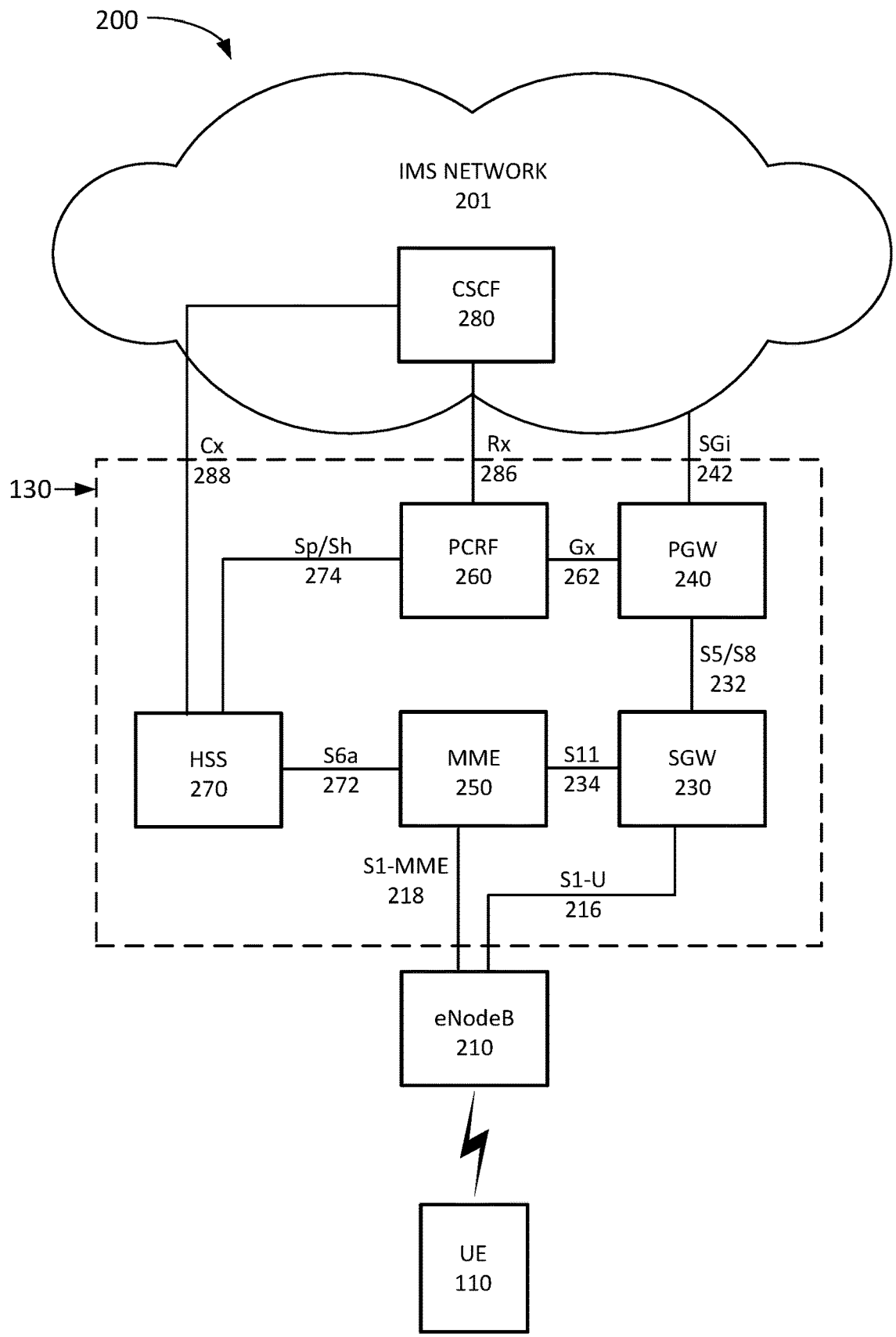
FIG. 2 is a diagram illustrating exemplary components of a Fourth Generation core network of FIG. 1 according to an implementation described herein.

FIG. 2 illustrates a system 200 that includes exemplary components of core network 130 that includes a 4G LTE core network according to an implementation described herein. As shown in FIG. 2, system 200 may include UE device 110, eNodeB 210, core network 130, and an IMS network 201. IMS network 201 may correspond to, or be included in, data network 140. eNodeB 210 may correspond to, or be included in, base station 125. eNodeB 210 may communicate with UE device 110 using a 4G LTE air interface referred to as an Evolved Universal Mobile Telecommunications System (UMTS) Terrestrial Radio Access Network (E-UTRA) interface 212.

As shown in FIG. 2, core network 130 may include a Serving Gateway (SGW) 230, a Packet Data Network (PDN) Gateway (PGW) 240, a Mobility Management Entity (MME) 250, a Policy and Charging Rules Function (PCRF) 260, and HSS 270. While FIG. 2 depicts a single eNodeB 210, a single SGW 230, a single PGW 240, a single MME 250, a single PCRF 260, and a single HSS 270, a single CSCF 280, for illustration purposes, in practice, system 200 may include multiple eNodeBs 210, multiple SGWs 230, multiple PGWs 240, multiple MMES 250, multiple PCRFs 260, multiple HSSes 270, and/or multiple CSCFs 280.

The components depicted in FIG. 2 may be implemented as dedicated hardware components or as virtualized functions implemented on top of a common shared physical infrastructure using SDN. For example, an SDN controller may implement one or more of the components of FIG. 2 using an adapter implementing a VNF virtual machine, a CNF container, an event driven serverless architecture interface, and/or another type of SDN architecture. The common shared physical infrastructure may be implemented using one or more devices 500 described below with reference to FIG. 5 in a cloud computing center associated with core network 130. Additionally, or alternatively, some, or all, of the common shared physical infrastructure may be implemented using one or more devices 500 described below with reference to FIG. 5 using a MEC system associated with base stations 125.

eNodeB 210 may interface with core network 130 via an interface referred to as an S1 interface, which may include both a control plane S1-MME interface 218 and a data plane S1-U interface 216. S1-MME interface 218 may interface with MME 250. S1-MME interface 218 may be implemented, for example, with a protocol stack that includes a Non-Access Stratum (NAS) protocol and/or Stream Control Transmission Protocol (SCTP). An S1-U interface 216 may interface with SGW 230 and may be implemented, for example, using GTPv2.

SGW 230 may provide an access point to and from UE device 110, may handle forwarding of data packets for UE device 110, and may act as a local anchor point during handover procedures between different eNodeBs 210. SGW 230 may interface with PGW 240 through an S5/S8 interface 232. S5/S8 interface 232 may be implemented, for example, using GTPv2. PGW 240 may function as a gateway to IP network 201 through an SGi interface 242. A particular UE device 110, while connected to a single SGW 230, may be connected to multiple PGWs 240, one for each data network 140 with which UE device 110 communicates. For example, a particular PGW 240 may be associated with a particular APN and UE device 110 may connect to the particular APN by connecting to the PGW 240 associated with the particular APN. Thus, UE device 110 may be connected to one or more APNs at a particular time.

MME 250 may implement control plane processing for core network 130. For example, MME 250 may manage the mobility of UE device 110, implement tracking and paging procedures for UE device 110, activate and deactivate bearers for UE device 110, authenticate a user of UE device 110, and/or interface to non-LTE radio access networks. A bearer may represent a logical channel with particular quality of service (QoS) requirements. MME 250 may also select a particular SGW 230 for a particular UE device 110. A particular MME 250 may interface with other MMEs 250 (not shown in FIG. 2) in core network 130 and may send and/or receive information associated with UE devices 110, which may allow one MME 250 to take over control plane processing of UE devices 110 serviced by another MME 250, if the other MME 250 becomes unavailable. Furthermore, MME 250 may manage non-IP communication with UE device 110 using NAS. MME 250 may page UE device 110 based on mobility category information associated with UE device 110 obtained from HSS 270.

MME 250 may communicate with SGW 230 through an S11 interface 234. S11 interface 234 may be implemented, for example, using GTPv2. S11 interface 234 may be used to create and manage a new session for a particular UE device 110. S11 interface 234 may be activated when MME 250 needs to communicate with SGW 230, such as when the particular UE device 110 attaches to core network 130, when bearers need to be added or modified for an existing session for the particular UE device 110, when a connection to a new PGW 240 needs to be created, or during a handover procedure (e.g., when the particular UE device 110 needs to switch to a different SGW 230).

PCRF 260 may implement policy and charging rules functions, such as establishing Quality of Service (QoS) requirements, setting allowed bandwidth and/or data throughput limits for particular bearers and/or UE devices 110, determining charges for a particular service for a UE device 110, and/or other types of policy or charging rules. PCRF 260 may communicate with PGW 240 through a Gx interface 262. Gx interface 262 may be implemented, for example, using Diameter protocol.

HSS 270 may store subscription information associated with UE devices 110 and/or information associated with users of UE devices 110. For example, HSS 270 may store subscription profiles that include authentication, access, and/or authorization information. Each subscription profile may include information identifying UE device 110, authentication and/or authorization information for UE device 110, services enabled and/or authorized for UE device 110, device group membership information for UE device 110, and/or other types of information associated with UE device 110. If UE device 110 is associated with a 4G subscription, HSS 270 may store a 4G subscription profile for UE device 110, and if UE device 110 is associated with a 5G subscription, HSS may store a 5G subscription for UE device 110. Furthermore, the subscription profile may include a Subscription-Type AVP that identifies that whether a UE device 110 is associated with a 5G subscriber. HSS 270 may communicate with MME 250 through an S6a interface 272. S6a interface 272 may be implemented, for example, using a Diameter protocol. HSS 270 may communicate with PCRF device 260 using an Sp/Sh interface 274.

IMS network 201 may be associated with an IMS core identity for a particular subscription for UE device 110. HSS 250 may receive information identifying the IMS core identity for a subscription and may provide the IMS core identity to a particular UE device 110 that is connected to access network 130. CSCF 280 may handle signaling, controlling of media paths, and activation of applications in IMS network 201. CSCF 280 may communicate with PCRF 260 through an Rx interface 286 and may communicate with HSS 250 through a Cx interface 288. Rx interface 286 and Cx interface 288 may be implemented, for example, using Diameter protocol.

Although FIG. 2 shows exemplary components of core network 130, in other implementations, core network 130 may include fewer components, different components, differently arranged components, or additional components than depicted in FIG. 2. Additionally, or alternatively, one or more components of core network 130 may perform functions described as being performed by one or more other components of core network 130.

Figure 3:
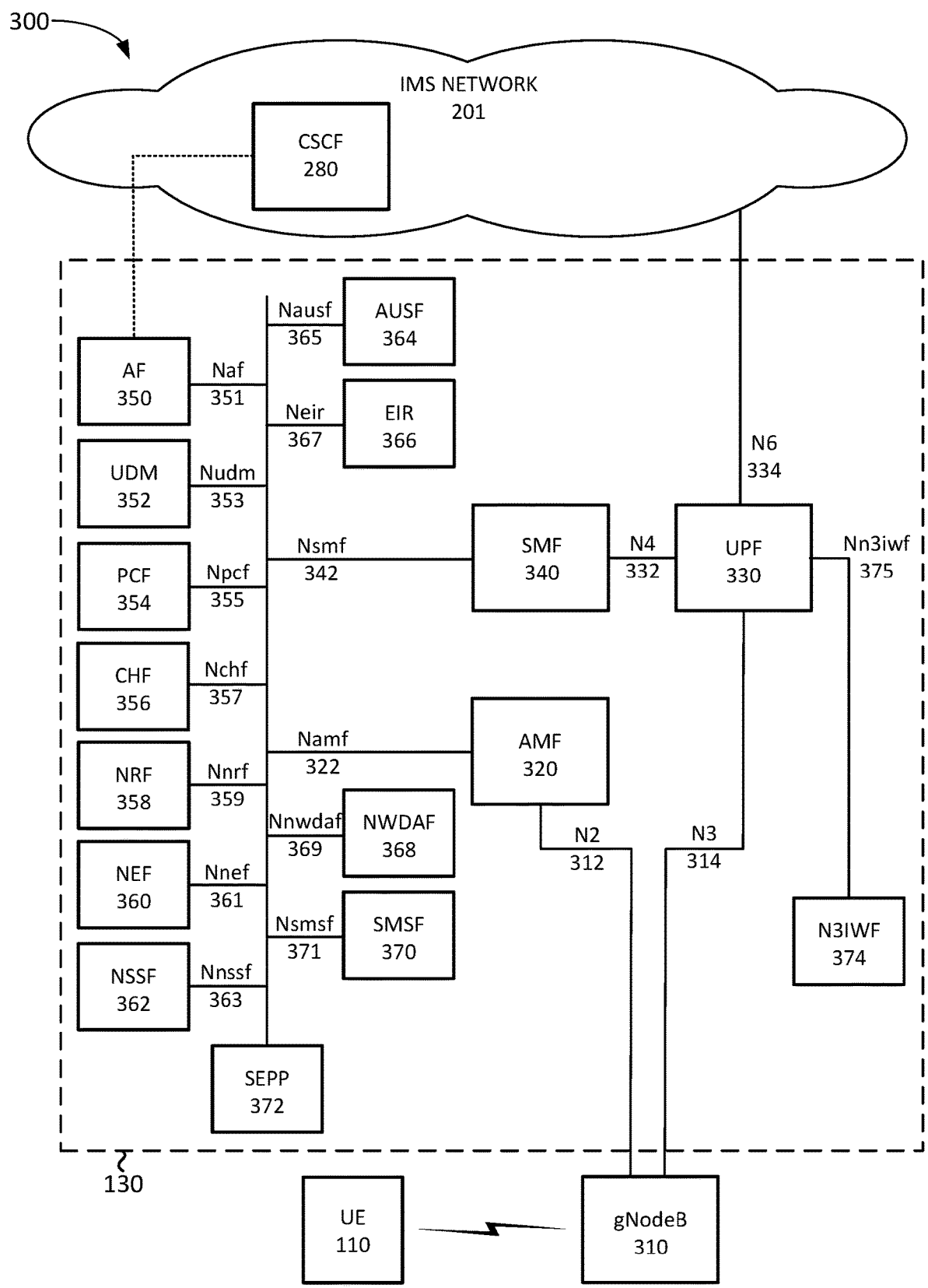
FIG. 3 is a diagram illustrating exemplary components of a Fifth Generation core network of FIG. 1 according to an implementation described herein.

FIG. 3 illustrates a system 300 that includes exemplary components of core network 130 in the context of environment 100 according to an implementation described herein. As shown in FIG. 3, system 300 may include UE device 110, gNodeB 310, core network 130, and IMS network 201.

gNodeB 310 (corresponding to base station 125) may include one or more devices (e.g., base stations) and other components and functionality that enable UE device 110 to wirelessly connect to core network 130 using 5G NR Radio Access Technology (RAT). For example, gNodeB 310 may service one or more cells, with each cell being served by a wireless transceiver with an antenna array configured for mm-wave wireless communication. gNodeB 310 may correspond to base station 125. gNodeB 310 may communicate with AMF 320 using an N2 interface 312 and communicate with UPF 330 using an N3 interface 314.

Core network 130 may include an Access and Mobility Function (AMF) 320, a User Plane Function (UPF) 330, a Session Management Function (SMF) 340, an Application Function (AF) 350, a Unified Data Management (UDM) 352, a Policy Control Function (PCF) 354, a Charging Function (CHF) 356, a Network Repository Function (NRF) 358, a Network Exposure Function (NEF) 360, a Network Slice Selection Function (NSSF) 362, an Authentication Server Function (AUSF) 364, a 5G Equipment Identity Register (EIR) 366, a Network Data Analytics Function (NWDAF) 368, a Short Message Service Function (SMSF) 370, a Security Edge Protection Proxy (SEPP) 372, and a Non-3GPP Inter-Working Function (N3IWF) 374.

While FIG. 3 depicts a single AMF 320, UPF 330, SMF 340, AF 350, UDM 352, PCF 354, CHF 356, NRF 358, NEF 360, NSSF 362, AUSF 364, EIR 366, NWDAF 368, SMSF 370, SEPP 372, and N3IWF 374 for illustration purposes, in practice, core network 130 may include multiple AMFs 320, UPFs 330, SMFs 340, AFs 350, UDMs 352, PCFs 354, CHFs 356, NRFs 358, NEFs 360, NSSFs 362, AUSFs 364, EIRs 366, NWDAFs 368, SMSFs 370, SEPPs 372, and/or N3IWFs 374.

The components depicted in FIG. 3 may be implemented as dedicated hardware components or as virtualized functions implemented on top of a common shared physical infrastructure using SDN. For example, an SDN controller may implement one or more of the components of FIG. 3 using an adapter implementing a VNF virtual machine, a CNF container, an event driven serverless architecture interface, and/or another type of SDN architecture. The common shared physical infrastructure may be implemented using one or more devices 500 described below with reference to FIG. 5 in a cloud computing center associated with core network 130. Additionally, or alternatively, some, or all, of the common shared physical infrastructure may be implemented using one or more devices 500 described below with reference to FIG. 5 using a MEC system associated with base stations 125.

AMF 320 may perform registration management, connection management, reachability management, mobility management, lawful intercepts, Short Message Service (SMS) transport between UE device 110 and SMSF 370, session management messages transport between UE device 110 and SMF 340, access authentication and authorization, location services management, functionality to support non-3GPP access networks, and/or other types of management processes. AMF 320 may be accessible by other function nodes via an Namf interface 322.

UPF 330 may maintain an anchor point for intra/inter-RAT mobility, maintain an external Packet Data Unit (PDU) point of interconnect to a particular data network 140 (e.g., IMS network 201), perform packet routing and forwarding, perform the user plane part of policy rule enforcement, perform packet inspection, perform lawful intercept, perform traffic usage reporting, perform QoS handling in the user plane, perform uplink traffic verification, perform transport level packet marking, perform downlink packet buffering, forward an "end marker" to a Radio Access Network node (e.g., gNodeB 310), and/or perform other types of user plane processes. UPF 330 may communicate with SMF 340 using an N4 interface 332 and connect to data network 140 using an N6 interface 334.

SMF 340 may perform session establishment, session modification, and/or session release, perform IP address allocation and management, perform Dynamic Host Configuration Protocol (DHCP) functions, perform selection and control of UPF 330, configure traffic steering at UPF 330 to guide the traffic to the correct destinations, terminate interfaces toward PCF 354, perform lawful intercepts, charge data collection, support charging interfaces, control and coordinate of charging data collection, terminate session management parts of NAS messages, perform downlink data notification, manage roaming functionality, and/or perform other types of control plane processes for managing user plane data. SMF 340 may be accessible via an Nsmf interface 342.

AF 350 may provide services associated with a particular application, such as, for example, an application for influencing traffic routing, an application for accessing NEF 360, an application for interacting with a policy framework for policy control, and/or other types of applications. AF 350 may be accessible via an Naf interface 351, also referred to as an NG5 interface. For example, CSCF 280 may be configured as a particular AF 350 (shown as the dotted line connecting AF 350 and CSCF 280 in FIG. 3).

UDM 352 may maintain subscription information for UE devices 110, manage subscriptions, generate authentication credentials, handle user identification, perform access authorization based on subscription data, perform network function registration management, maintain service and/or session continuity by maintaining assignment of SMF 340 for ongoing sessions, support SMS delivery, support lawful intercept functionality, and/or perform other processes associated with managing user data. UDM 352 may be accessible via a Nudm interface 353.

PCF 354 may support policies to control network behavior, provide policy rules to control plane functions (e.g., to SMF 340), access subscription information relevant to policy decisions, perform policy decisions, and/or perform other types of processes associated with policy enforcement. PCF 354 may be accessible via Npcf interface 355. CHF 356 may perform charging and/or billing functions for core network 130. CHF 356 may be accessible via Nchf interface 357.

NRF 358 may support a service discovery function and maintain profiles of available network function (NF) instances and their supported services. An NF profile may include an NF instance identifier (ID), an NF type, a Public Land Mobile Network (PLMN) ID associated with the NF, network slice IDs associated with the NF, capacity information for the NF, service authorization information for the NF, supported services associated with the NF, endpoint information for each supported service associated with the NF, and/or other types of NF information. Additionally, NRF 358 may include one or more transport network KPIs associated with the NF instance. NRF 358 may be accessible via an Nnrf interface 359.

NEF 360 may expose capabilities and events to other NFs, including 3$^{rd}$ party NFs, AFs, edge computing NFs, and/or other types of NFs. Furthermore, NEF 358 may secure provisioning of information from external applications to core network 130, translate information between core network 130 and devices/networks external to core network 130, support a Packet Flow Description (PFD) function, and/or perform other types of network exposure functions. NEF 360 may be accessible via Nnef interface 361.

NSSF 362 may select a set of network slice instances to serve a particular UE device 110, determine network slice selection assistance information (NSSAI), determine a particular AMF 320 to serve a particular UE device 110, and/or perform other types of processing associated with network slice selection or management. NSSF 362 may be accessible via Nnssf interface 363.

AUSF 364 may perform authentication. For example, AUSF 364 may implement an Extensible Authentication Protocol (EAP) authentication server and may store authentication keys for UE devices 110. AUSF 364 may be accessible via Nausf interface 365. EIR 366 may authenticate a particular UE device 110 based on UE device identity, such as a Permanent Equipment Identifier (PEI). For example, EIR 366 may check to see if a PEI has been blacklisted. EIR 366 may be accessible via Neir interface 367.

NWDAF 368 may collect analytics information associated with radio access network 120 and/or core network 130. For example, NWDAF 368 may collect accessibility KPIs (e.g., an RRC setup success rate, a RAB success rate, etc.), retainability KPIs (e.g., a call drop rate, etc.), mobility KPIs (e.g., a handover success rate, etc.), service integrity KPIs (e.g., downlink average throughput, downlink maximum throughput, uplink average throughput, uplink maximum throughput, etc.), utilization KPIs (e.g., resource block utilization rate, average processor load, etc.), availability KPIs (e.g., radio network unavailability rate, etc.), traffic KPIs (e.g., downlink traffic volume, uplink traffic volume, average number of users, maximum number of users, a number of voice bearers, a number of video bearers, etc.), response time KPIs (e.g., latency, packet arrival time, etc.), and/or other types of wireless network KPIs.

SMSF 370 may perform SMS services for UE devices 110. SMSF 370 may be accessible via Nsmsf interface 371. SEPP 372 may implement application layer security for all layer information exchanged between two NFs across two different PLMNs. N3IWF 374 may interconnect to a non-3GPP access device, such as, for example, a WiFi access point (not shown in FIG. 3). N3IWF 374 may facilitate handovers for UE device 110 between radio access network 120 and the non-3GPP access device. N3IWF 374 may be accessible via Nn3iwf interface 375.

Although FIG. 3 shows exemplary components of core network 130, in other implementations, core network 130 may include fewer components, different components, differently arranged components, or additional components than depicted in FIG. 3. Additionally or alternatively, one or more components of core network 130 may perform functions described as being performed by one or more other components of core network 130. For example, core network 130 may include additional function nodes not shown in FIG. 3, such as a Unified Data Repository (UDR), an Unstructured Data Storage Network Function (UDSF), an a Location Management Function (LMF), a Lawful Intercept Function (LIF), a Binding Session Function (BSF), and/or other types of functions. Furthermore, while particular interfaces have been described with respect to particular function nodes in FIG. 3, additionally, or alternatively, core network 130 may include a reference point architecture that includes point-to-point interfaces between particular function nodes.

Figure 4:
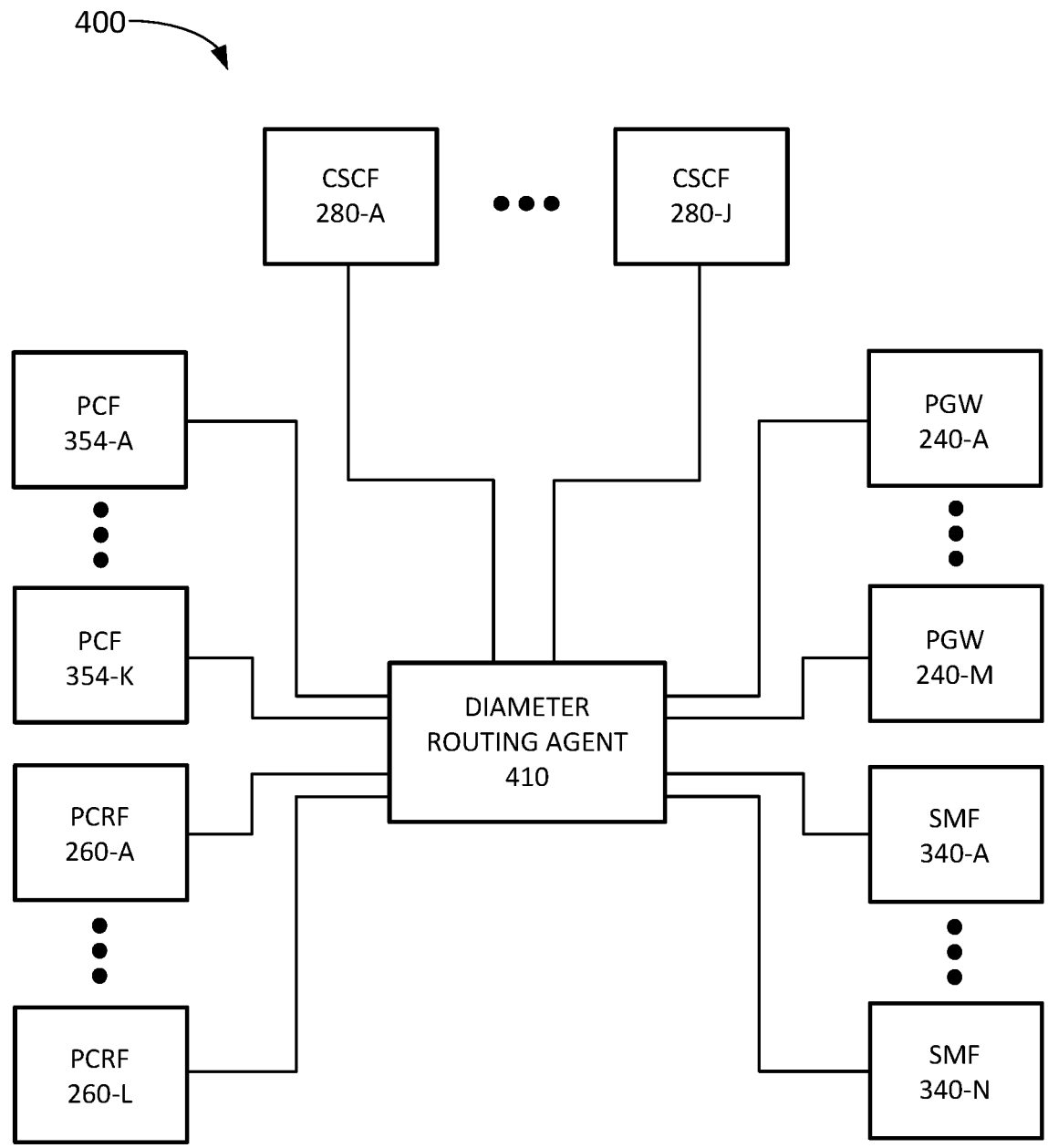
FIG. 4 is a diagram illustrating an exemplary system that includes particular components of the Fourth Generation core network of FIG. 2 and of the Fifth Generation core network of FIG. 3 according to an implementation described herein.

FIG. 4 illustrates an exemplary system 400 that includes particular components of the 4G core network 130 of FIG. 2 and of the 5G core network of FIG. 3 according to an implementation described herein. As shown in FIG. 4 system 400 may include a DRA 410, CSCFs 280-A to 280-J, PCFs 354-A to 354-K, PCRFs 260-A to 260-L, PGWs 240-A to 240-M, and SMFs 340-A to 340-N.

DRA 410 may act as a routing agent for Diameter messages for CSCFs 280, PCFs 354, PCRFs 260, PGWs 240, SMFs 340, and/or other devices in core network 130 and/or IMS network 201. DRA 410 may perform load balancing, throttling, redirecting, prioritizing, and/or modifying of Diameter messages in core network 130 and/or IMS network 201.

DRA 410 may select a particular PCRF 260 or a particular PCF 354 for a particular Diameter session based on whether the Diameter session is associated with a 5G subscriber or based on whether the Diameter session includes a gateway device identifier that identifies a particular PGW 240 or a particular SMF 340 and/or UPF 330. Exemplary components of DRA 310 are described below with reference to FIG. 6.

Although FIG. 4 shows exemplary components of system 400, in other implementations, system 400 may include fewer components, different components, differently arranged components, or additional components than depicted in FIG. 4. Additionally, or alternatively, one or more components of system 400 may perform functions described as being performed by one or more other components of system 400.

Figure 5:
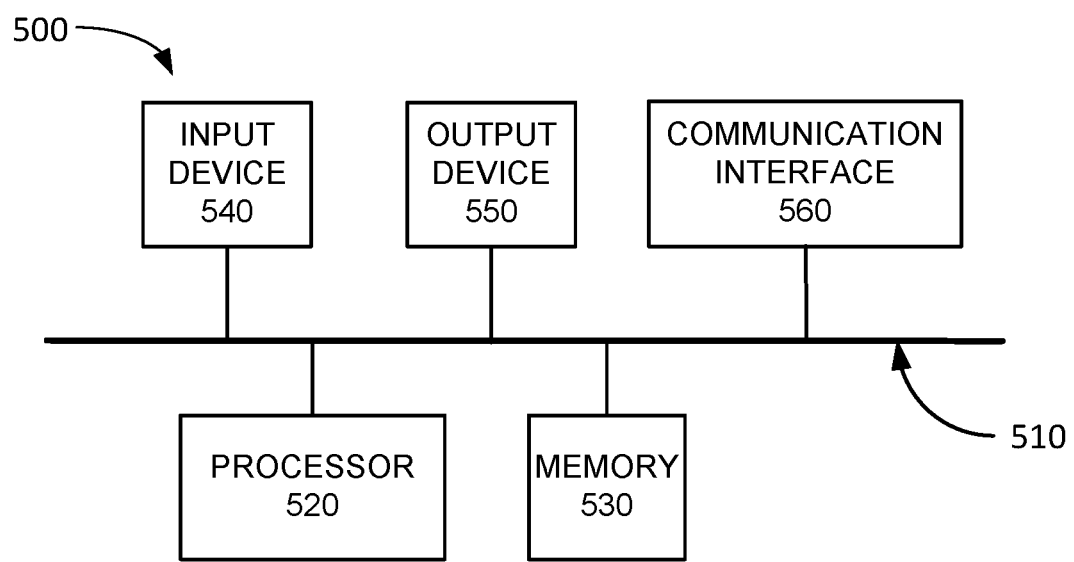
FIG. 5 is a diagram illustrating exemplary components of a device that may be included in a component of FIG. 1, FIG. 2, or FIG. 3 according to an implementation described herein.

FIG. 5 illustrates example components of a device 500 according to an implementation described herein. UE device 110, eNodeB 210, SGW 230, PGW 240, MME 250, PCRF device 260, HSS 270, CSCF 280, gNodeB 310, AMF 320, UPF 330, SMF 340, AF 350, UDM 352, PCF 354, CHF 356, NRF 358, NEF 360, NSSF 362, AUSF 364, EIR 366, NWDAF 368, SMSF 370, SEPP 372, N3IWF 374, DRA 410, and/or other components of core network 130, may each include one or more devices 500. As shown in FIG. 5, device 500 may include a bus 510, a processor 520, a memory 530, an input device 540, an output device 550, and a communication interface 560.

Bus 510 may include a path that permits communication among the components of device 500. Processor 520 may include any type of single-core processor, multi-core processor, microprocessor, latch-based processor, and/or processing logic (or families of processors, microprocessors, and/or processing logics) that interprets and executes instructions. In other embodiments, processor 520 may include an application-specific integrated circuit (ASIC), a field-programmable gate array (FPGA), and/or another type of integrated circuit or processing logic.

Memory 530 may include any type of dynamic storage device that may store information and/or instructions, for execution by processor 520, and/or any type of non-volatile storage device that may store information for use by processor 520. For example, memory 530 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 540 may allow an operator to input information into device 500. Input device 540 may include, for example, a keyboard, a mouse, a pen, a microphone, a remote control, an audio capture device, an image and/or video capture device, a touch-screen display, and/or another type of input device. In some embodiments, device 500 may be managed remotely and may not include input device 540. In other words, device 500 may be "headless" and may not include a keyboard, for example.

Output device 550 may output information to an operator of device 500. Output device 550 may include a display, a printer, a speaker, and/or another type of output device. For example, device 500 may include a display, which may include a liquid-crystal display (LCD) for displaying content to the customer. In some embodiments, device 500 may be managed remotely and may not include output device 550. In other words, device 500 may be "headless" and may not include a display, for example.

Communication interface 560 may include a transceiver that enables device 500 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 560 may include a transmitter that converts baseband signals to radio frequency (RF) signals and/or a receiver that converts RF signals to baseband signals. Communication interface 560 may be coupled to one or more antennas/antenna arrays for transmitting and receiving RF signals.

Communication interface 560 may include a logical component that includes input and/or output ports, input and/or output systems, and/or other input and output components that facilitate the transmission of data to other devices. For example, communication interface 560 may include a network interface card (e.g., Ethernet card) for wired communications and/or a wireless network interface (e.g., a WiFi) card for wireless communications. Communication interface 560 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As will be described in detail below, device 500 may perform certain operations relating to selection of a policy device. Device 500 may perform these operations in response to processor 520 executing software instructions contained in a computer-readable medium, such as memory 530. A computer-readable medium may be defined as a non-transitory memory device. A memory device may be implemented within a single physical memory device or spread across multiple physical memory devices. The software instructions may be read into memory 530 from another computer-readable medium or from another device. The software instructions contained in memory 530 may cause processor 520 to perform processes described herein. Alternatively, hardwired circuitry may be used in place of, or in combination with, software instructions to implement processes described herein. Thus, implementations described herein are not limited to any specific combination of hardware circuitry and software.

Although FIG. 5 shows exemplary components of device 500, in other implementations, device 500 may include fewer components, different components, additional components, or differently arranged components than depicted in FIG. 5. Additionally, or alternatively, one or more components of device 500 may perform one or more tasks described as being performed by one or more other components of device 500.

Figure 6:
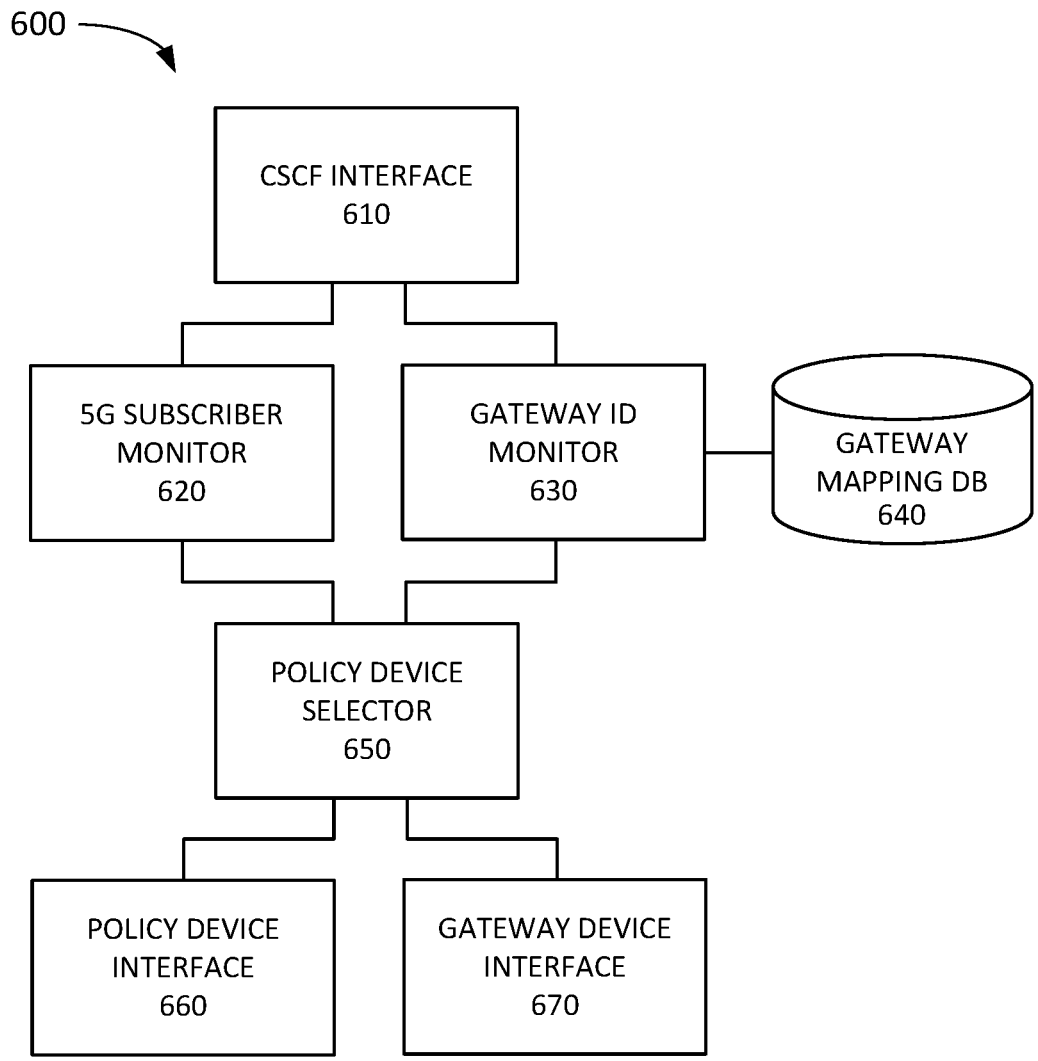
FIG. 6 is a diagram illustrating exemplary components of the Diameter Routing Agent of FIG. 4 according to an implementation described herein.

FIG. 6 illustrates exemplary components of DRA 410. The components of DRA 410 may be implemented, for example, via processor 520 executing instructions from memory 530. Alternatively, some or all of the components of DRA 410 may be implemented via hard-wired circuitry. As shown in FIG. 5, DRA 410 may include a CSCF interface 610, a 5G subscriber monitor 620, a gateway ID monitor 630, a gateway mapping database (DB) 640, a policy device selector 650, a policy device interface 660, and a gateway device interface 670.

CSCF interface 610 may be configured to communicate with CSCF 280. For example, CSCF interface 610 may implement a Diameter Rx interface. 5G subscriber monitor 620 may monitor Diameter messages to determine whether a Diameter message includes a Subscription-Type AVP. If 5G subscriber monitor 620 detects a Subscription-Type AVP, 5G subscription monitor 620 may inform policy device selector 650 whether the subscriber associated with a Diameter message is a 5G subscriber.

Gateway ID monitor 630 may build a mapping table, which relates a particular PGW 240 or particular SMF 340 (and/or UPFs 330) to a particular PCRF 260 or a particular PCF 354, in gateway mapping DB 640. In some implementations, the information stored in gateway mapping DB 640 may be obtained from a network administration device that includes topology information associated with core network 130. In other implementations, the information stored in gateway mapping DB 640 may be built up over time as DRA 410 processes Diameter messages. As an example, each time a new PGW 240, SMF 340, UPF 330, PCRF 260, and/or PCF 354 is added and/or activated in core network 130, DRA 410 may update gateway mapping DB 640. As yet another example, DRA 410 may associate a particular PGW 240, SMF 340, and/or UPFs 330, with a particular PCRF 260 or PCF 354 based on location information.

Gateway ID monitor 630 may monitor Diameter message to determine whether a Diameter message includes a gateway device ID. If gateway ID monitor 630 detects a gateway device ID in a Diameter message, gateway ID monitor 630 may inform policy device selector 650 as to which particular PCRF 260 or PCF 354 is associated with a Diameter message.

Policy device selector 650 may select a particular PCRF 260 or a particular PCF 354 for a Diameter message associated with a particular IMS call based on information provided to policy device selector 650 by 5G subscriber monitor 620 and/or gateway ID monitor 630. For example, in some implementations, DRA 410 may include only 5G subscriber monitor 620; in other implementations, DRA 410 may include only gateway ID monitor 630; and in yet other implementations, DRA 410 may include both 5G subscriber monitor 620 and gateway ID monitor 630. After selecting a PCRF 260 or PCF 354 for a particular IMS call, policy device selector 650 may send Diameter messages associated with the particular IMS call to the selected PCRF 260 or PCF 354 via policy device interface 660.

Policy device interface 660 may be configured to communicate with policy devices. For example, policy device interface 660 may implement Rx interface 286 with PCRFs 260 and may implement Npcf 355 interface and/or an NG5 with PCFs 354. Gateway device interface 670 may be configured to communicate with gateway devices. For example, gateway device interface 670 may implement Gx interface 262 with PGW 240 and Nsmf interface 342 and/or an NG7 interface with SMF 340.

Although FIG. 6 shows exemplary components of DRA 410, in other implementations, DRA 410 may include fewer components, different components, additional components, or differently arranged components than depicted in FIG. 6. Additionally, or alternatively, one or more components of DRA 410 may perform one or more tasks described as being performed by one or more other components of DRA 410.

Figure 7:
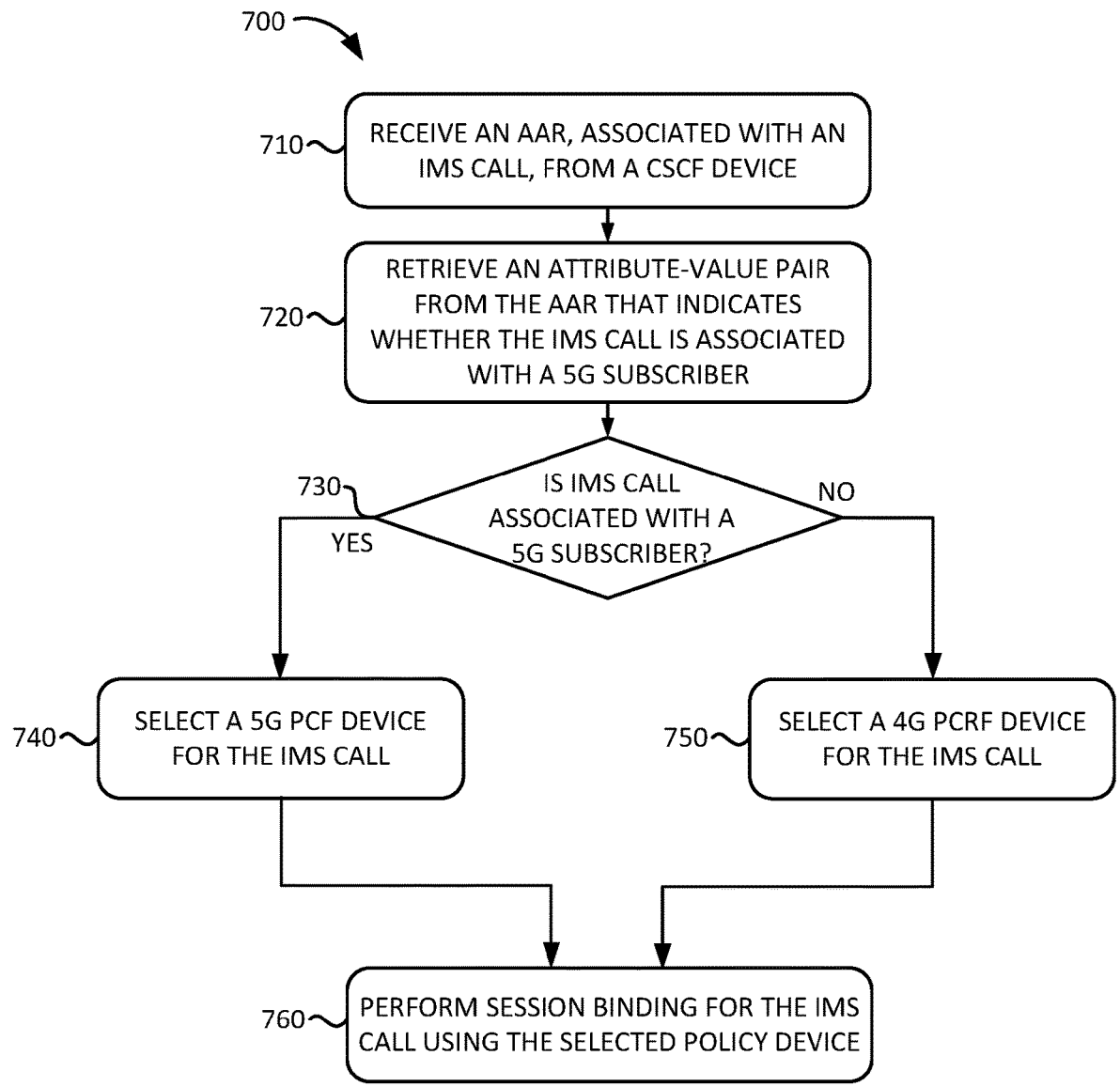
FIG. 7 is a flowchart of a first process for selecting a policy device according to an implementation described herein.

FIG. 7 is a flowchart 700 of a first process for selecting a policy device according to an implementation described herein. In some implementations, the process of FIG. 7 may be performed by DRA 410, PCRF 260, and/or PCF 354. In other implementations, some or all of the process of FIG. 7 may be performed by another device or a group of devices separate from DRA 410, PCRF 260, and/or PCF 354.

The process of FIG. 7 may include receiving an AAR, associated with an IMS call, from a CSCF device (block 710). For example, CSCF 280 may send an AAR to DRA 410, intended for a policy device. The AAR may include a Subscription-Type AVP that indicates whether the IMS call is associated with a 5G subscriber. CSCF 280 may obtain the subscriber type information from a subscriber profile stored in HSS 270.

An AVP may be retrieved from the AAR that indicates whether the IMS call is associated with a 5G subscriber (block 720) and a determination may be made as to whether the IMS call is associated with a 5G subscriber based on the retrieved AVP pair (block 730). If it is determined that the IMS call is associated with the a 5G subscriber (block 730—YES), a 5G PCF device may be selected for the IMS call (block 740). For example, DRA 410 may forward the AAR to PCF 354. If it is determined that the IMS call is not associated with the a 5G subscriber (block 730—NO), a 4G PCRF device may be selected for the IMS call (block 750). For example, DRA 410 may forward the AAR to PCRF 260.

Session binding may be performed for the IMS call using the selected policy device (block 760). For example, the PCRF 260 or PCF 354 may perform session binding to associate the Rx session with CSCF 280 with an existing Gx session (in a 4G network) or an existing PDU session (in a 5G network) that is associated with the IMS call (e.g., via which the IMS call was originated or terminated).

Figure 8:
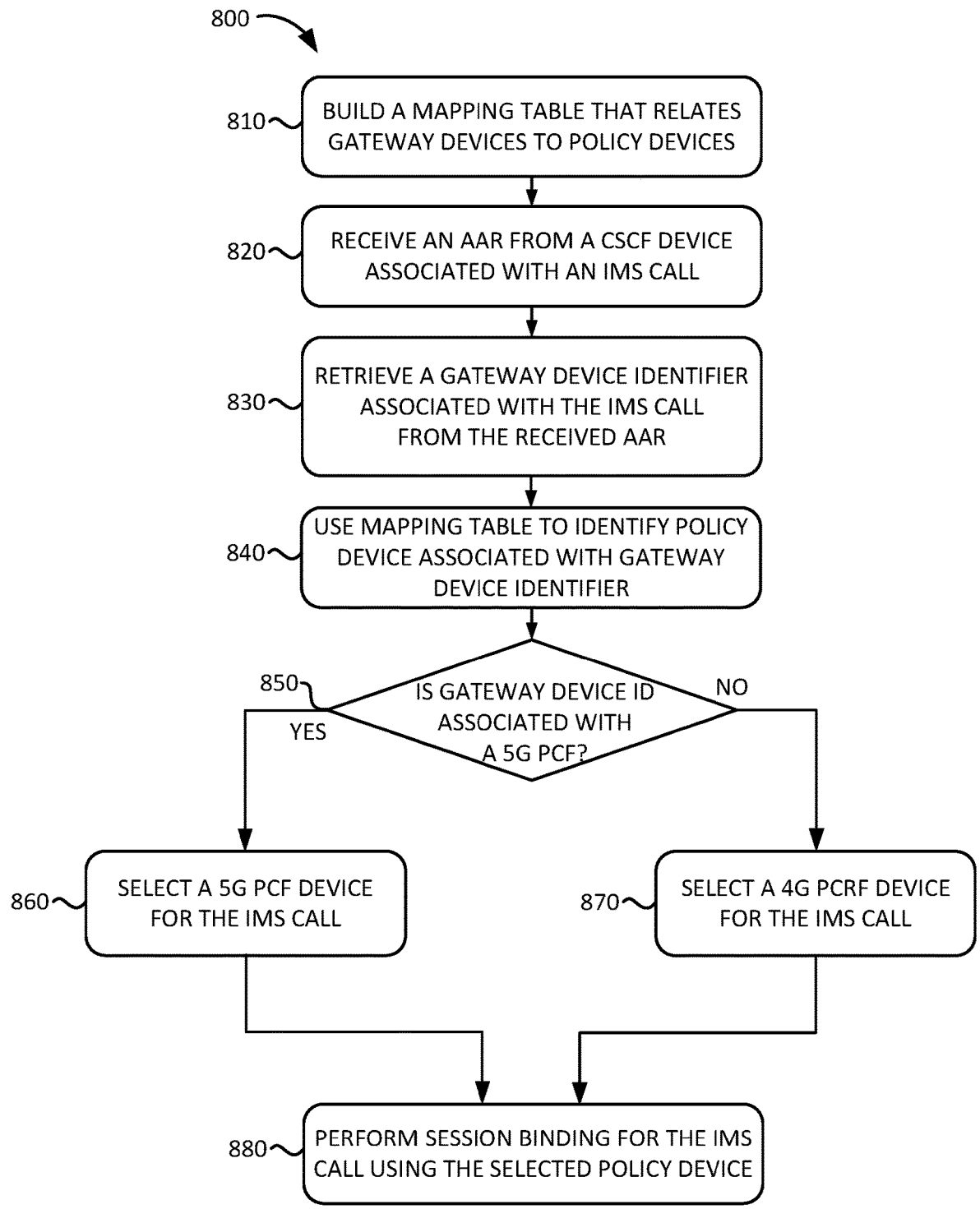
FIG. 8 is a flowchart of a second process for selecting a policy device according to an implementation described herein.

FIG. 8 is a flowchart 800 of a second process for selecting a policy device according to an implementation described herein. In some implementations, the process of FIG. 8 may be performed by DRA 410, PCRF 260, and/or PCF 354. In other implementations, some or all of the process of FIG. 8 may be performed by another device or a group of devices separate from DRA 410, PCRF 260, and/or PCF 354.

The process of FIG. 8 may include building a mapping table that relates gateway devices to policy devices (block 810). For example, DRA 410 may build a mapping table, which relates a particular PGW 240 or particular SMF 340 (and/or UPFs 330) to a particular PCRF 260 or a particular PCF 354, in gateway mapping DB 640. The process of FIG. 8 may further include receiving an AAR, associated with an IMS call, from a CSCF device (block 820). For example, CSCF 280 may send an AAR to DRA 410, intended for a policy device. The AAR may include a gateway device ID associated with the IMS call. The gateway device ID may identify a particular PGW 240 or SMF 340 (and/or UPF 330) associated with an existing Gx session (in a 4G network) or an existing PDU session (in a 5G network) that is associated with the IMS call (e.g., via which the IMS call was originated or terminated). CSCF 280 may obtain the gateway device ID from a subscriber profile stored in HSS 270.

A gateway device ID may be retrieved from the AAR (block 830), the mapping table may be used to identify a policy device associated with the retrieved gateway device ID (block 840), and a determination may be made as to whether the gateway device ID is associated with a 5G PCF (block 850). If it is determined that the gateway device ID is associated with 5G PCF (block 850—YES), a 5G PCF device may be selected for the IMS call (block 860). For example, DRA 410 may forward the AAR to the particular PCF 354 associated with the gateway device ID. If it is determined that the gateway device ID is not associated with 5G PCF (block 850—NO), a 4G PCRF device may be selected for the IMS call (block 870). For example, DRA 410 may forward the AAR to the particular PCRF 260 associated with the gateway device ID.

Session binding may be performed for the IMS call using the selected policy device (block 880). For example, the PCRF 260 or PCF 354 may perform session binding to associate the Rx session with CSCF 280 with an existing Gx session (in a 4G network) or an existing PDU session (in a 5G network) that is associated with the IMS call (e.g., via which the IMS call was originated or terminated).

Figure 9:
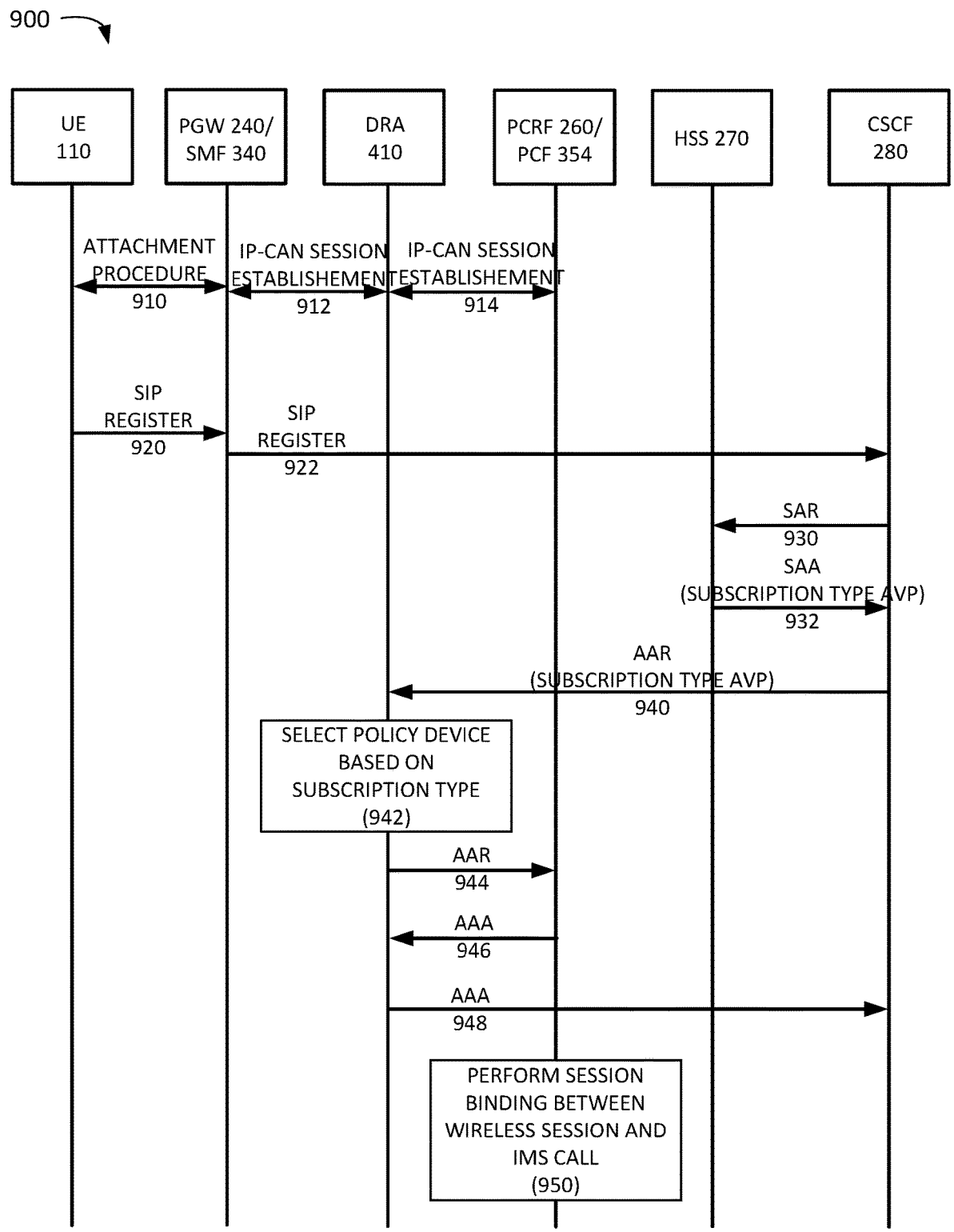
FIG. 9 is a diagram of a first exemplary signal flow according to an implementation described herein.

FIG. 9 is a diagram of a first exemplary signal flow 900 that utilizes a Subscription-Type AVP to select a policy device. As shown in FIG. 9, signal flow 900 may include UE device 110 performing an attachment procedure to establish a connection with either PGW 240 or UPF 330. During the attachment procedure, PGW 240 (in a 4G core network 130) or SMF 340 controlling UPF 330 (in a 5G core network 130) may send an IP-CAN session establishment message to either PCRF 260 (in a 4G core network 130) or PCF 354 (in a 5G core network 130) via DRA 410 (signals 912 and 914). For example, in a 4G core network 130, PGW 240 may send a CC request to PCRF 260 over Gx interface 262 via DRA 410 and PCRF 260 may respond with a CC answer that installs PCC rules and event triggers on PGW 240 for UE device 110. In a 5G network, SMF 340 may communicate with PCF 354 to obtain the PCC rules and event triggers over an NG7 interface.

During the initiation of an IMS call, UE device 110 may send a SIP REGISTER message to CSCF 280 via PGW 240 (in a 4G core network 130) or UPF 330 controlled by SMF 340 (in a 5G core network) (signals 920 and 922). Upon receiving the SIP REGISTER message, CSCF 280 may send a Server Assignment Request (SAR) to HSS 270 and may receive a Server Assignment Answer (SAA) (signals 930 and 932). The SAA may include a Subscription-Type AVP, retrieved from a subscription profile associated with UE device 110, which identifies whether UE device 110 is associated with a 5G subscription.

CSCF 280 may then send a Diameter AAR to DRA 410 using a Diameter Rx interface to be delivered to a policy device (e.g., PCRF 260 or PCF 354) (signal 940). DRA 410 may select a policy device based on the subscription type associated with UE device 110 (block 942). If the Subscription-Type AVP indicates that UE device 110 is associated with a 5G subscriber, DRA 410 may select PCF 354. If the Subscription-Type AVP indicates that UE device 110 is not associated with a 5G subscriber, DRA 410 may select PCRF 260.

DRA 410 may then forward the AAR to the selected policy device and may receive an AAA and forward the received AAA to CSCF 280 (signals 944, 946, 948). The selected policy device may then perform session binding to associate the existing session with the gateway device for the IMS call with the policy device session also associated with the IMS call (block 950). For example, in a 4G core network 130, PCRF 260 may associate the Rx session with CSCF 280 with the Gx session established with PGW 240. In a 5G core network 130, PCF 354 may associate the Rx session with CSCF 280 (configured to function as AF 350) with an NG7 session with SMF 340 that controls a PDU session established for UE device 110 via UPF 330.

Figure 10:
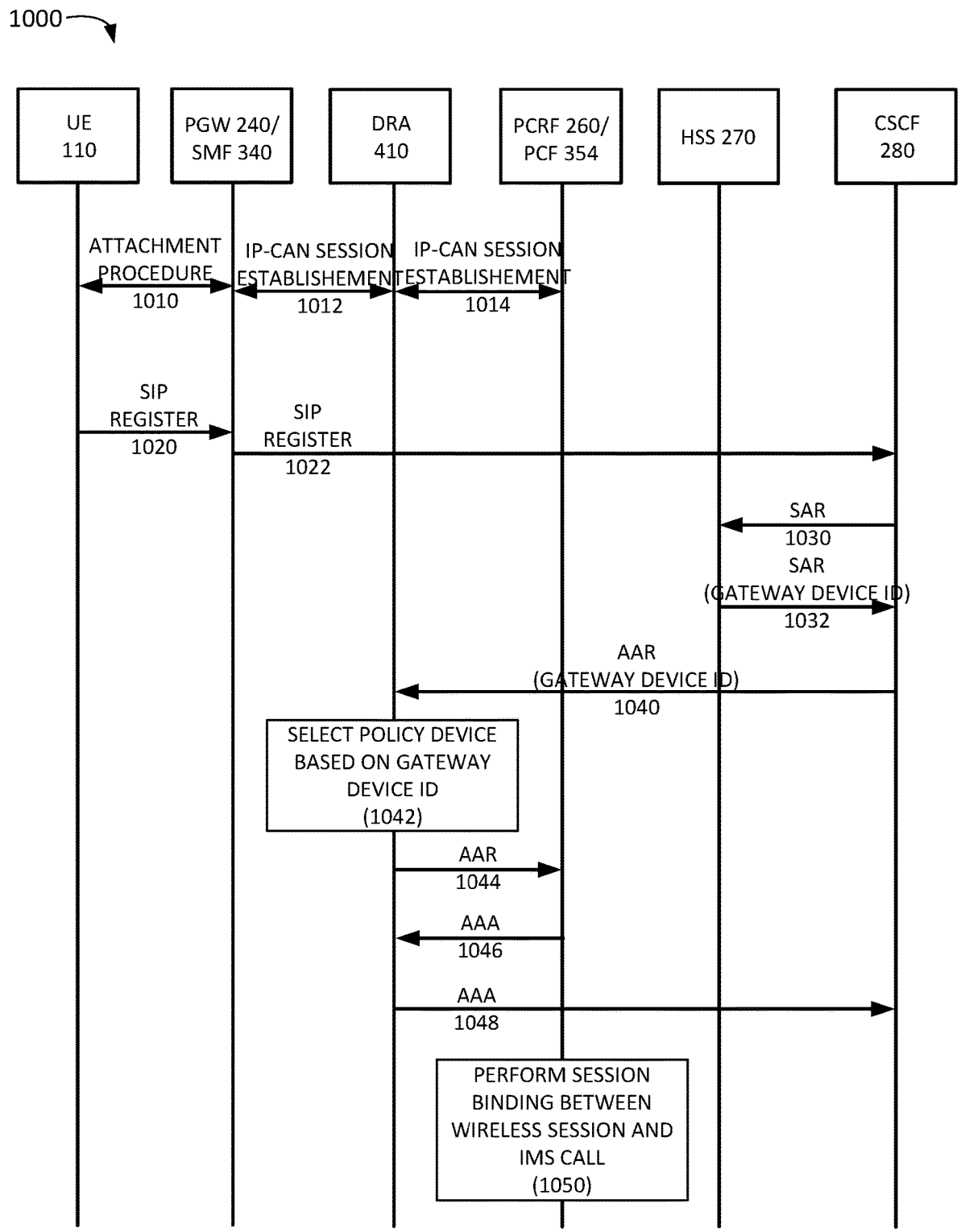
FIG. 10 is a diagram of a second exemplary signal flow according to an implementation described herein.

FIG. 10 is a diagram of a second exemplary signal flow 1000 that utilizes a gateway device ID to select a policy device. As shown in FIG. 10, signal flow 1000 may include UE device 110 performing an attachment procedure to establish a connection with either PGW 240 or UPF 330.

During the attachment procedure, PGW 240 (in a 4G core network 130) or SMF 340 controlling UPF 330 (in a 5G core network 130) may send an IP-CAN session establishment message to either PCRF 260 (in a 4G core network 130) or PCF 354 (in a 5G core network 130) via DRA 410 (signals 1012 and 1014). For example, in a 4G core network 130, PGW 240 may send a CC request to PCRF 260 over Gx interface 262 via DRA 410 and PCRF 260 may respond with a CC answer that installs PCC rules and event triggers on PGW 240 for UE device 110. In a 5G network, SMF 340 may communicate with PCF 354 to obtain the PCC rules and event triggers over an NG7 interface.

During the initiation of an IMS call, UE device 110 may send a SIP REGISTER message to CSCF 280 via PGW 240 (in a 4G core network 130) or UPF 330 controlled by SMF 340 (in a 5G core network) (signals 1020 and 1022). Upon receiving the SIP REGISTER message, CSCF 280 may send a SAR to HSS 270 and may receive a SAA (signals 1030 and 1032). The SAA may include a gateway device ID, retrieved from a subscription profile associated with UE device 110, which identifies whether UE device 110 is associated with a 5G subscription.

CSCF 280 may then send a Diameter AAR to DRA 410 using a Diameter Rx interface to be delivered to a policy device (e.g., PCRF 260 or PCF 354) (signal 1040). DRA 410 may select a policy device based on the gateway device ID associated with UE device 110 (block 1042). If the gateway device ID indicates that UE device 110 is associated with SMF 340, DRA 410 may select PCF 354. If the gateway device ID indicates that UE device 110 is associated with PGW 240, DRA 410 may select PCRF 260.

DRA 410 may then forward the AAR to the selected policy device and may receive an AAA and forward the received AAA to CSCF 280 (signals 1044, 1046, 1048). The selected policy device may then perform session binding to associate the existing session with the gateway device for the IMS call with the policy device session also associated with the IMS call (block 1050). For example, in a 4G core network 130, PCRF 260 may associate the Rx session with CSCF 280 with the Gx session established with PGW 240. In a 5G core network 130, PCF 354 may associate the Rx session with CSCF 280 (configured to function as AF 350) with an NG7 session with SMF 340 that controls a PDU session established for UE device 110 via UPF 330.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of blocks have been described with respect to FIGS. 7 and 8, and a series of signals with respect to FIGS. 9 and 10, the order of the blocks and/or signals may be modified in other implementations. Further, non-dependent blocks and/or signals may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/ "comprising" when used in this specification are taken to specify the presence of stated features, integers, steps or components but does not preclude the presence or addition of one or more other features, integers, steps, components or groups thereof.

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

To the extent the aforementioned embodiments collect, store, or employ personal information of individuals, it should be understood that such information shall be collected, stored, and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:
   receiving, by a computer device, a request associated with a user, wherein the request includes information identifying whether the user is a Fifth Generation (5G) subscriber, and wherein the request is received during a call setup;
   selecting, by the computer device, a Fourth Generation (4G) Policy and Charging Rules Function (PCRF) device or a 5G Policy Control Function (PCF) device based on the information included in the received request, wherein the computer device is configured to function as a Diameter routing agent (DRA) that routes messages between devices in a core network that includes the 4G PCRF device and the 5G PCF device; and forwarding, by the computer device, the received request to the selected 4G PCRF device or 5G PCF device.

2. The method of claim 1, wherein the request includes a Diameter Authentication Authorization Request (AAR) received from a Call Session Control Function (CSCF) device.

3. The method of claim 2, wherein the CSCF device is configured to communicate with the computer device as a 5G Application Function (AF).

4. The method of claim 1, wherein the request includes an attribute value pair that identifies the user as a 5G subscriber, and wherein selecting the 4G PCRF device or the 5G PCF device based on the information included in the received request includes:

selecting the 5G PCF device, in response to the request including the attribute value pair that identifies the user as a 5G subscriber.

5. The method of claim 1, wherein the request includes an attribute value pair that identifies the user as not being a 5G subscriber, and wherein selecting the 4G PCRF device or the 5G PCF device based on the information included in the received request includes:

selecting the 4G PCRF device, in response to the request including the attribute value pair that identifies the user as not being a 5G subscriber.

6. The method of claim 1, wherein the request further includes a gateway device identifier associated with a data connection associated with the user, the method further comprising:

building a mapping table that relates particular gateway device identifiers to particular 4G PCRF devices or 5G PCF devices.

7. The method of claim 6, further comprising:

receiving another request associated with another user, wherein the other request includes the gateway device identifier; and selecting the 4G PCRF device or the 5G PCF device based on the gateway device identifier using the mapping table.

8. The method of claim 7, wherein the gateway device identifier corresponds to a 4G Packet Data Network Gateway (PGW) identifier, and wherein selecting the 4G PCRF device or the 5G PCF device based on the information included in the received other request includes:

selecting the 4G PCRF device, in response to the gateway device identifier corresponding to a 4G PGW identifier.

9. The method of 7, wherein the gateway device identifier corresponds to a 5G Session Management Function (SMF) identifier, and wherein selecting the 4G PCRF device or the 5G PCF device based on the information included in the received other request includes:

selecting the 5G PCF device, in response to the gateway device identifier corresponding to a 5G SMF identifier.

10. A computer device comprising:

a memory storing instructions; and a processor configured to execute the instructions to:

receive a request associated with a user, wherein the request includes information identifying whether the user is a Fifth Generation (5G) subscriber, and wherein the request is received during a call setup;

select a Fourth Generation (4G) Policy and Charging Rules Function (PCRF) device or a 5G Policy Control Function (PCF) device based on the information included in the received request, wherein the computer device is configured to function as a Diameter routing agent (DRA) that routes messages between devices in a core network that includes the 4G PCRF device and the 5G PCF device; and forward the received request to the selected 4G PCRF device or 5G PCF device.

11. The computer device of claim 10, wherein the request includes a Diameter Authentication Authorization Request (AAR) received from a Call Session Control Function (CSCF) device.

12. The computer device of claim 11, wherein the CSCF device is configured to communicate with the computer device as a 5G Application Function (AF).

13. The computer device of claim 10, wherein the request includes an attribute value pair that identifies the user as a 5G subscriber, and wherein, when selecting the 4G PCRF device or the 5G PCF device based on the information included in the received request, the processor is further configured to:

select the 5G PCF device, in response to the request including the attribute value pair that identifies the user as a 5G subscriber.

14. The computer device of claim 10, wherein the request includes an attribute value pair that identifies the user as not being a 5G subscriber, and wherein, when selecting the 4G PCRF device or the 5G PCF device based on the information included in the received request, the processor is further configured to:

select the 4G PCRF device, in response to the request including the attribute value pair that identifies the user as not being a 5G subscriber.

15. The computer device of claim 10, wherein the request further includes a gateway device identifier associated with a data connection associated with the user, and wherein the processor is further configured to:

build a mapping table that relates particular gateway device identifiers to particular 4G PCRF devices or 5G PCF devices.

16. The computer device of claim 15, wherein the processor is further configured to:

receive another request associated with another user, wherein the other request includes the gateway device identifier; and select the 4G PCRF device or the 5G PCF device based on the gateway device identifier using the mapping table.

17. The computer device of claim 16, wherein the gateway device identifier corresponds to a 4G Packet Data Network Gateway (PGW) identifier, and wherein, when selecting the 4G PCRF device or the 5G PCF device based on the information included in the received other request, the processor is further configured to:

select the 4G PCRF device, in response to the gateway device identifier corresponding to a 4G PGW identifier.

18. The computer device of claim 16, wherein the gateway device identifier corresponds to a 5G Session Management Function (SMF) identifier, and wherein, when selecting the 4G PCRF device or the 5G PCF device based on the information included in the received other request, the processor is further configured to:

select the 5G PCF device, in response to the gateway device identifier corresponding to a 5G SMF identifier.

19. A system comprising:

a Call Session Control Function (CSCF) device configured to:

receive a request to establish an Internet Protocol Multimedia Subsystem (IMS) call associated with a user; and send a Diameter Authentication Authorization Request (AAR) associated with the IMS call, wherein the AAR includes information identifying whether the user is a Fifth Generation (5G) subscriber; and a Diameter Routing Agent (DRA) device configured to:
route messages between devices in a core network that includes a Fourth Generation (4G) Policy and Charging Rules Function (PCRF) device and a 5G Policy Control Function (PCF) device;

receive the AAR from the CSCF device;

select the 4G PCRF device or the 5G PCF device based on the information included in the received AAR; and forward the received AAR to the selected 4G PCRF device or 5G PCF device.

20. The system of claim 19, wherein the DRA device is further configured to:
build a mapping table that relates particular gateway device identifiers to particular 4G PCRF devices or 5G PCF devices;

receive another request associated with another user, wherein the other request includes a gateway device identifier; and selecting the 4G PCRF device or the 5G PCF device based on the gateway device identifier included in the received other request and the mapping table.

* * * * *